Nov. 21, 1961
H. S. YOUNGS
3,009,254
LEVEL
Filed May 27, 1960
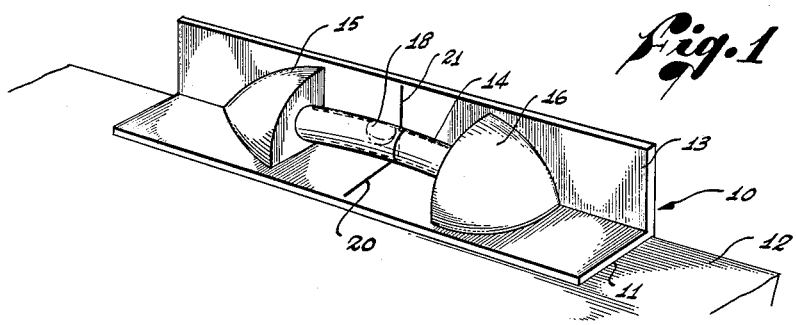
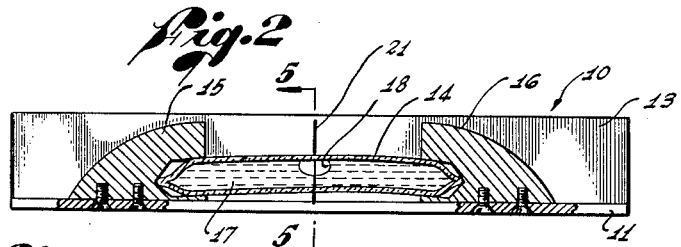
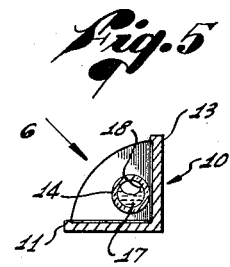
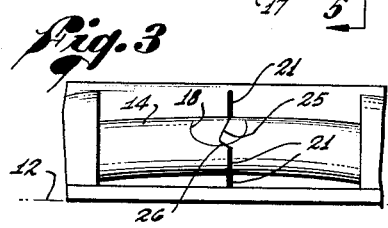
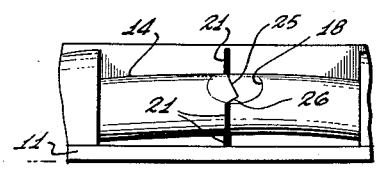
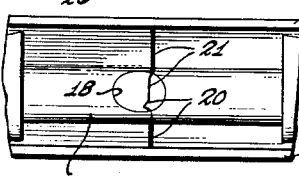
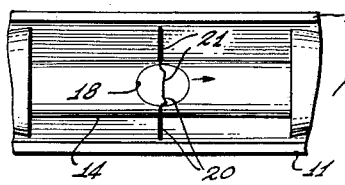
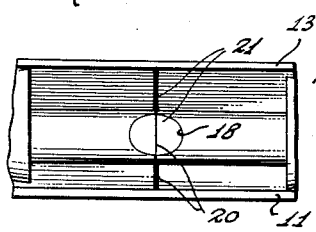
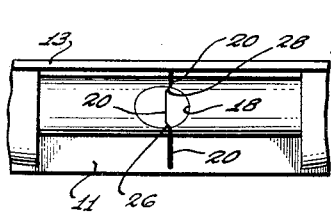
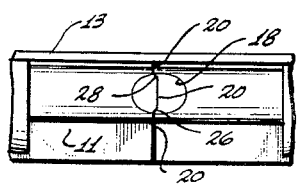
INVENTOR.
HOMER S. YOUNGS
Attorneys

United States Patent Office 3,009,254
Patented Nov. 21, 1961

3,009,254
LEVEL
Homer S. Youngs, Pomona, Calif.
(975 S. Oakland Ave., Pasadena, Calif.)
Filed May 27, 1960, Ser. No. 32,448
4 Claims. (Cl. 33—211)

This invention relates to optical devices, and more particularly to an improved spirit level with which to determine whether a structure is truly horizontal.

Typically, a spirit level of the prior art comprises an elongated, curved glass tube that is oriented and held in a position such that the midpoint thereof is disposed above its ends. The top of the glass is scribed, or otherwise marked, to provide two parallel index lines that are located equal distances from, and on opposite sides of, the midpoint of the tube. The tube is filled with a clear, transparent tube-wetting liquid, such as alcohol or ether, so as to provide a bubble within the tube. The tube is normally held in a support, such as a block of wood, having a plane surface. The arrangement is such that when the plane surface is truly horizontal, as on a horizontal surface, the bubble is centered between the index lines.

One of the primary difficulties with prior art levels is that they lack the degree of accuracy desired in many situations. The chief reason for this is that the average person cannot possibly determine when the bubble is precisely centered between the scribed index lines on the glass tube. As will be apparent, all he can do is make a best guess that the bubble is centered.

A primary disadvantage of spirit levels of the prior art is the expense and appreciable rejection in manufacture. This occurs because of the difficulty of scribing the index lines at the required locations. This is a difficult task and can result in failure to accomplish the desired result with the desired accuracy.

It is an object of this invention to provide a unique spirit level that overcomes the above and other disadvantages of the prior art.

It is another object of this invention to provide a spirit level which utilizes the optical properties of the bubble in a unique manner.

A further object of this invention is to provide a spirit level in which the tube extends across one or more index lines, and in which the bubble is shaped so that a line viewed therethrough is laterally undistorted only when a surface being checked bears the desired relationship to horizontal or vertical.

A still further object of this invention is to provide a spirit level for which index lines are separate from the tube, and which avoids much of the expense and rejection of prior art levels.

The above and other objects and advantages of this invention will become apparent from the following description taken in conjunction with the accompanying drawing of a preferred embodiment thereof, in which:

FIGURE 1 is a perspective view of my improved spirit level, showing the relative positions of the curved glass tube and the vertical and horizontal lines placed on the supporting angle element;

FIGURE 2 is a longitudinal sectional view of my improved spirit level, showing how the lines viewed through the bubble are narrower than the lines viewed through the air and the glass tube and the liquid therein, and showing the precise alignment of the thin line with the remainder of the lines when the level is perfectly horizontal;

FIGURE 3 is a fragmentary side elevation view of the level in the position shown in FIGURE 2, but wherein the surface on which the level is resting is tilted in one direction relative to the horizontal, showing the lines viewed through the bubble to be displaced on one side of the vertical line;

FIGURE 4 is a fragmentary side elevation view, similar to FIGURE 3, but wherein the surface on which the level is resting is tilted in the other direction relative to the horizontal, showing the thin line seen through the bubble as being displaced to the right.

FIGURE 5 is a sectional view taken along the line 5—5 of FIGURE 2;

FIGURE 6 is a fragmentary perspective view taken from the direction indicated at 6 in FIGURE 5, showing the thin line viewed through the bubble displaced in the same direction as in FIGURE 3;

FIGURE 7 is a fragmentary perspective view, similar to FIGURE 6, showing the thin line viewed through the bubble displaced in the direction opposite to that shown in FIGURE 6;

FIGURE 8 is a fragmentary perspective view, similar to FIGURES 6 and 7, but wherein the thin line viewed through the bubble is precisely aligned with the vertical and horizontal lines scribed on the support, to indicate that the surface on which the level is resting is perfectly horizontal;

FIGURE 9 is a fragmentary top plan view of the level as seen by an observer looking down on the glass tube, showing the thin line seen through the bubble to be parallel to the line on the bottom of the level, and displaced to the left, the level in such case being tilted in the direction indicated for FIGURES 3 and 6; and FIGURE 10 is a fragmentary top plan view, similar to FIGURE 9, showing a thin line viewed through the bubble to appear parallel to the line on the bottom of the level and displaced to the right thereof, in the case where the level is tilted in the direction indicated for FIGURES 4 and 7.

Referring to FIGURE 1, there is shown an angle element 10 having one plate or leg 11 resting on a flat surface 12, and having its other plate or leg 13 extending at right angles from the leg 11.

Referring to FIGURES 2 and 5, along with FIGURE 1, a curved glass tube 14 is supported at its ends, as indicated by supports 15, 16, adjacent the corner formed by the legs 11, 13 of the angle 10. The tube 14 is held by the supports 15, 16 so that it is bowed upwardly from the leg 11. Such tube is filled with a liquid, indicated at 17, save for a single bubble 18.

The legs 11, 13 have respective lines 20, 21 located thereon, such lines 20, 21 extending transversely of the legs. The lines 20, 21 are longer than the diameter of the tube 14, and each extends from the junction of the legs 11, 13. If the surface 12 is perfectly horizontal, the bubble 18 is precisely centered relative to the lines 20, 21.

FIGURES 2-4 illustrate the use of my improved level when viewing the bubble 18 from a horizontal position. Due to the optical characteristics of the bubble 18, in conjunction with the walls of the tube 14, the portions of the lines 20, 21 viewed through the bubble 18 appear to be thinner than the lines. When the bubble is precisely centered relative to the lines 20, 21, there is alignment of the portions of the lines seen through the bubble and above and below the bubble.

When sighting through the bubble 18, one sees portions of both the lines 20, 21 even though he is looking or sighting along a horizontal plane. Referring to FIGURE 3, the bubble 18 is shown slightly to the left of the center, in the situation where the surface 12 on which the level rests is tilted upwardly to the left. In such a situation, the observer sees a line segment 25 that extends to the left and substantially the depth of the bubble 18. The line 25 appears to be connected at its upper end directly to the point on the line 12 that is immediately adjacent the upper part of the tube 14.

The lower end of the line 25 appears to the observer to be connected by a short, curved line 26 to the point on the line 21 that appears to extend from below the bubble. In reality, the connecting line 26 is a reflection of the line 20 on the leg 11 of the level.

FIGURE 4 illustrates the situation where the flat surface 12 is tilted upwardly to the right. In this case, the bubble 18 is to the right of the center of the tube 14. Here again, as in the situation in FIGURE 3, the portion of the line 21 above and below the bubble appear to be separated by a line 25 that extends to the right from the center of the tube 14, and which is connected by a short, curved portion 26 to the extension of the line 21 below the bubble.

As will be apparent, when one sights along a horizontal plane through the bubble 18, and the surface 12 is perfectly horizontal, he will see what appears to be a continuous vertical line comprising the portions of the line 21 above and below the bubble 18, and a much thinner line extending through the center of the bubble. The lowermost portion of this thin line is actually formed from a reflection of the line 20.

When one sights through the bubble 18 from a position directly above the level, i.e., along a vertical plane, it appears as though the line 20 is discontinuous in the region of the bubble 18. As shown in FIGURE 9, in which the bubble 18 is in the same relative position as in FIGURE 3, the line 21 has a section which, due to the optical properties of the bubble, appears parallel to the remainder of the line 21, and displaced to the left thereof. As mentioned, the portion of the line 21 seen through the bubble 18 appears to be separated from the remainder of the line. However, close inspection of the bubble shows that there is a very short connecting line 28 between the adjacent ends of the line segment 21 seen through the bubble and the line segment 21 nearest the vertical leg 13. Such connecting line 28 is created by reflection of the vertical line 21 on such vertical leg 13. FIGURE 10 illustrates precisely the same arrangement, but wherein the position of the bubble 18 corresponds to that shown in FIGURE 4.

FIGURES 6–8 illustrate what is observed when sighting along a line at 45 degrees from either of the legs of the level. In such case, the line seen through the bubble 18 is a composite of reflections from the horizontal and vertical lines 20, 21, approximately half the length of the distorted line seen through the bubble being the result of the respective lines 20, 21 as viewed through the bubble.

Inspection of the various illustrations above described shows that my improved level is unique in that it substantially eliminates the possibility of sighting along a line at either side of the center of the bubble to obtain an apparent level indication. In this connection, and as previously mentioned, it is possible with prior art levels to view the bubble from a position off the center of the tube, so that it is possible to view an apparent centering of the bubble relative to a scribed index on the tube, when in fact the surface on which the level is located is definitely not horizontal. But in my invention, this source of error is eliminated, because portions of both the lines 20, 21 form different portions of the lines seen through the bubble. Either or both of the portions of the lines 20, 21 seen through the bubble 18 are noticeably out of alignment when the bubble is off center (i.e., when the surface 12 is not truly horizontal) or when the viewer is sighting from a position not directly in line with the lines 20, 21. It is only when the surface 12 is truly horizontal and the viewer is sighting through the bubble along a plane that includes both the lines 20, 21, that the line portions seen through the bubble will be shown to be in perfect alignment with the lines 20, 21.

From the foregoing, it will be apparent that while I have illustrated and described a particular embodiment thereof, my invention embraces various modifications. For example, only one of the index lines shown need be used. If only one line is used, parallax error is possible; however, reliance may be placed on the ability of the human eye to recognize and minimize errors of this type. Also, a scale composed of a series of index lines may be used for either or both horizontal and vertical reference surfaces. Such a series of lines preferably would be parallel on the horizontal reference surface, and generally radial on the vertical reference surface from the center of curvature of the axis of the tube.

My invention also readily applies to lenticular levels, which are devices having transparent convex upper surfaces, wherein simultaneous leveling in two dimensions is accomplished. In such levels, the position of the bubble within an index circle, scribed on the top of the convex surface, determines that the desired orientation is achieved. With my invention, the circle may be eliminated, and a desired pattern of reference lines (e.g., cross-hairs, star, grid, etc.) below the bubble, e.g., on the supporting surface for the lenticular structure.

In all the arrangements mentioned herein, the accurate position of the bubble is indicated by the lack of lateral distortion of an index line or lines as seen through the bubble. Such a bubble position may represent a desired or measured departure from a vertical or horizontal reference, as well as no departure. Accordingly, I do not intend that my invention shall be limited, except as by the appended claims.

I claim:

1. A level device comprising: a flat plate having a transverse line on one surface thereof; an elongated, slightly curved transparent tube, said tube being filled with a transparent fluid sufficiently so that a bubble is formed; and means supporting said tube so that it extends across said line, said tube being positioned so that its center portion is spaced farther from said one surface than all other portions thereof.

2. A level, comprising: an angle element having leg portions at right angles, each leg having a line on one surface, said lines meeting at the junction of said legs; an elongated, slightly curved transparent tube filled with a transparent fluid having a bubble therein; and means supporting said tube so that it crosses said lines.

3. A level device comprising: a flat plate having an index line on one surface thereof; an elongated, curved transparent tube filled with a transparent fluid having a bubble therein; means supporting said tube so that it extends across said line; and a second plate extending from one edge of said first-mentioned plate, said second plate having an index line thereon, said lines meeting at the junction of said plates, said lines having portions viewable through said bubble that are laterally distorted by the optical properties of the bubble when the first plate is not horizontal, said bubble presenting said line portions to view as undistorted laterally when the first plate is truly horizontal.

4. A level, comprising: an angle element having leg portions at right angles, each leg having an index line on one surface, said lines meeting at the junction of said legs; an elongated transparent tube, said tube being slightly curved, said tube being filled with a tube-wetting transparent fluid in a manner to form a bubble; and means supporting said tube so that it extends past said index lines, said tube having its center portion spaced farther from one index line than all other portions thereof, both index lines having portions viewable through said bubble that are laterally distorted by said bubble when neither of said lines is horizontal, said bubble causing said portions of the lines to appear undistorted laterally when said one index line is horizontal.

References Cited in the file of this patent

UNITED STATES PATENTS 2,362,872    Weagle _____ Nov. 14, 1944
2,785,477    Gregory _____ Mar. 19, 1957